United States Patent
Chevalier

(10) Patent No.: US 9,820,371 B1
(45) Date of Patent: Nov. 14, 2017

(54) SYSTEMS AND METHODS FOR STABILIZING PLASMA GAS FLOW IN A PLASMA ARC TORCH

(71) Applicant: Hypertherm, Inc., Hanover, NH (US)

(72) Inventor: Adam Chevalier, Orford, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 15/152,959

(22) Filed: May 12, 2016

(51) Int. Cl.
*B23K 10/00* (2006.01)
*H05H 1/34* (2006.01)

(52) U.S. Cl.
CPC ........... *H05H 1/3405* (2013.01); *B23K 10/00* (2013.01); *H05H 2001/3484* (2013.01)

(58) Field of Classification Search
CPC ................ H05H 1/3405; H05H 1/34; H05H 2001/3484; B23K 10/00
USPC .. 219/121.5, 121.51, 121.55, 121.39, 74, 75
See application file for complete search history.

(56) References Cited

U.S. PATENT DOCUMENTS

| | | | | |
|---|---|---|---|---|
| 5,132,512 A * | 7/1992 | Sanders | ............... | B23K 10/006 219/121.48 |
| 5,317,126 A * | 5/1994 | Couch, Jr. | ................ | H05H 1/34 219/121.48 |
| 5,695,662 A * | 12/1997 | Couch, Jr. | ............ | B23K 10/006 219/121.39 |
| 7,598,473 B2 * | 10/2009 | Cook | ..................... | B23K 10/00 219/121.5 |
| 7,605,340 B2 * | 10/2009 | Duan | ....................... | H05H 1/34 219/121.49 |
| 8,338,740 B2 * | 12/2012 | Liebold | .................... | H05H 1/28 219/121.5 |
| 2002/0135283 A1 | 9/2002 | Hackett et al. | | |
| 2006/0091115 A1 * | 5/2006 | Higgins | ................ | B23K 10/00 219/121.5 |
| 2010/0206853 A1 | 8/2010 | Hussary et al. | | |
| 2014/0021172 A1 | 1/2014 | Sanders et al. | | |

FOREIGN PATENT DOCUMENTS

| WO | 9313905 | 7/1993 |
|---|---|---|
| WO | 2010039304 | 4/2010 |

* cited by examiner

*Primary Examiner* — Mark Paschall
(74) *Attorney, Agent, or Firm* — Proskauer Rose LLP

(57) ABSTRACT

A nozzle of a plasma arc torch is provided. The nozzle is configured to reduce fluid pressure surging in a nozzle plenum. The nozzle comprises a nozzle body having a proximal end and a distal end. The nozzle plenum is defined between the nozzle body and an electrode of the plasma arc torch. The nozzle includes a nozzle plenum gas inlet located at the proximal end of the nozzle body, a plasma gas exit orifice located at the distal end of the nozzle body, a plasma gas passageway fluidly connecting the nozzle plenum gas inlet to the plasma gas exit orifice, and an isolation chamber fluidly connected to the plasma gas passageway and the nozzle plenum. The isolation chamber is sized to receive a volume of substantially stagnant gas to reduce the fluid pressure surging in the nozzle plenum.

19 Claims, 8 Drawing Sheets

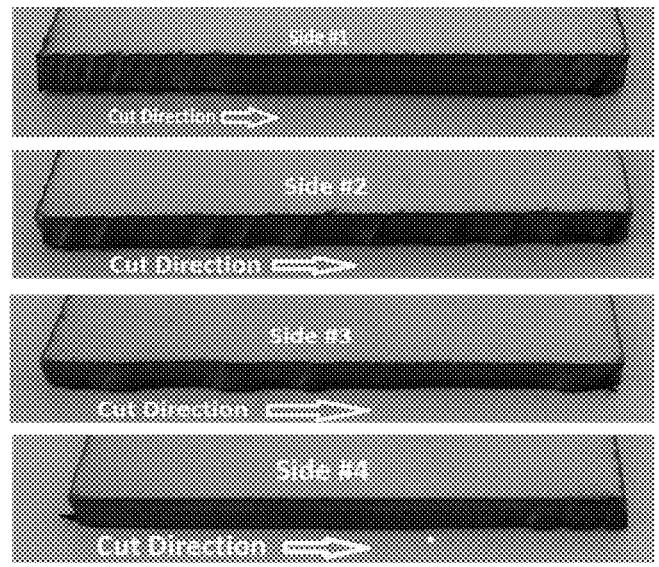
FIG. 6a
FIG. 6b
FIG. 6c
FIG. 6d
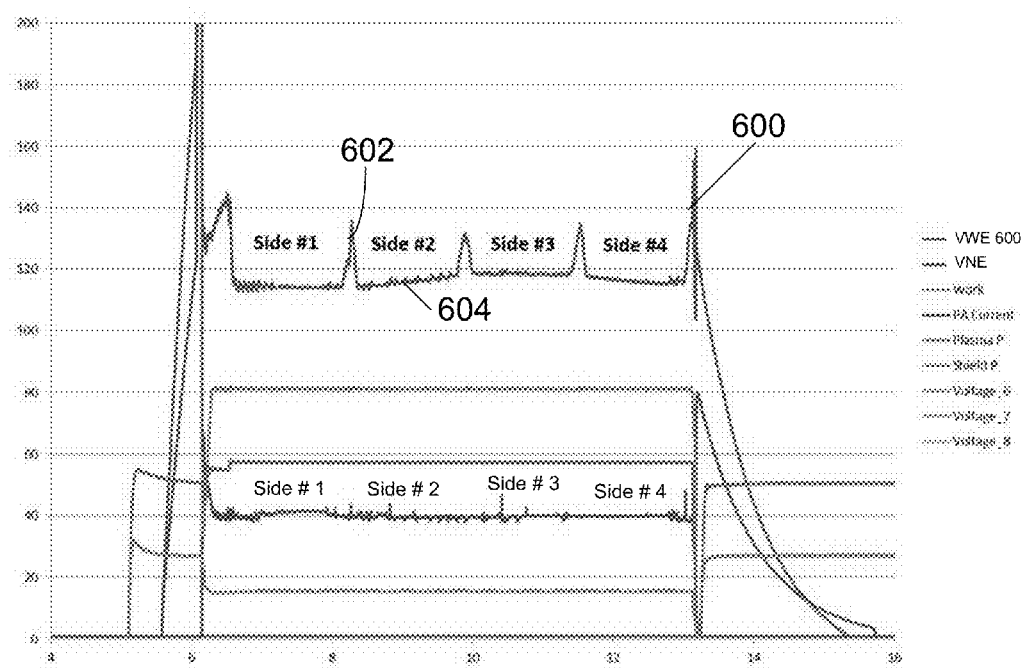
FIG. 7

SYSTEMS AND METHODS FOR STABILIZING PLASMA GAS FLOW IN A PLASMA ARC TORCH

TECHNICAL FIELD

The present invention relates generally to nozzles of plasma arc torches, and more specifically to improved nozzles configured to reduce fluid pressure surging in plasma arc torches.

BACKGROUND

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plenum formed between the electrode and the nozzle. In some torches, a retaining cap can be used to maintain the nozzle and/or swirl ring in the plasma arc torch. In operation, the torch produces a plasma arc, which is a constricted jet of an ionized gas with high temperature and sufficient momentum to assist with removal of molten metal.

Thermal processing torches can be high definition/high performance torches that produce desirable cut qualities, such as narrow cut kerfs and square cut angles. In plasma arc cutting, one effective way of producing the high quality cuts afforded by high definition/high performance torches is to use a smaller nozzle exit orifice diameter and/or higher plasma gas pressure, both of which tend to increase the cut speed. However, as the nozzle exit orifice diameter decreases and gas pressure increases, arc stability becomes unpredictable. Specifically, double arcing can occur or arc can reverberate in the nozzle due to nozzle exit orifice constriction and/or high gas pressure (e.g., created by back pressure from gas exiting the orifice as it passes over material, plate and/or workpiece). For example, during torch operation, the nozzle, including the plasma exit orifice, may be located at different distances (e.g., heights) relative to the workpiece. As the plasma exit orifice moves closer to a solid object (e.g., a workpiece) during torch operation, gas that is expelled through the plasma exit orifice at a high rate contacts the object and the gas can be pushed back toward the plasma exit orifice. The closer the plasma exit orifice is to the object, the more gas is pushed back toward the nozzle and against the continuous gas stream that is attempting to exit the plasma exit orifice, thereby causing reverberation in the nozzle plenum. Often, the reverberation is exacerbated by the use of an irregular workpiece surface during torch operation, where the irregular surface can be caused by, for example, plate debris/slag, weld joint, etc. This can further degrade cut quality and generate double arcing. Cut quality can be compromised in the form of, for example, wavy, choppy and/or serrated cut edges. Thus, systems and methods are needed to improve cut qualities in a thermal processing torch by reducing gas pressure surging in the nozzle plenum of the torch.

SUMMARY

Systems and methods of the present invention can reduce or eliminate reverberation caused by high fluid pressure in a plasma arc torch, such as in the plenum area of a plasma arc torch, thereby producing cleaner cut edges. For example, an isolation chamber can be constructed in the body of a nozzle and suitably configured to reduce and/or dampen fluid pressure surging in the nozzle plenum. The isolation chamber can be used in either a vented or non-vented nozzle to reduce fluid pressure surging through the nozzle. Advantages associated with the improved nozzles of the present invention include smoother flow of plasma gas through the nozzle plenum and enhanced arc stability (e.g., lowered risk of double arcing), which not only generate better cut quality but also extend the usable life of the nozzles.

In one aspect, a nozzle of a plasma arc torch is provided. The nozzle is configured to reduce fluid pressure surging in a nozzle plenum. The nozzle comprises a nozzle body having a proximal end and a distal end. The nozzle plenum is defined between the nozzle body and an electrode of the plasma arc torch. The nozzle includes a nozzle plenum gas inlet located at the proximal end of the nozzle body, a plasma gas exit orifice located at the distal end of the nozzle body, a plasma gas passageway fluidly connecting the nozzle plenum gas inlet to the plasma gas exit orifice, and an isolation chamber fluidly connected to the plasma gas passageway and the nozzle plenum. The isolation chamber is sized to receive a volume of substantially stagnant gas to reduce the fluid pressure surging in the nozzle plenum.

In some embodiments, the isolation chamber has a common inlet and outlet. In some embodiments, the isolation chamber comprises a constriction mechanism at the common inlet and outlet. In some embodiments, the nozzle further includes a vent channel fluidly connected to the plasma gas passageway at the plasma gas exit orifice. The common inlet and outlet of the isolation chamber can be fluidly connected to the vent channel. A vent hole can be connected to the vent channel. The isolation chamber can be axially located between the nozzle plenum gas inlet and the vent hole.

In some embodiments, the nozzle body further comprises a liner, a shell and a sealing surface between the liner and the shell that cooperatively define the isolation chamber.

In some embodiments, a pressure of the volume of substantially stagnant gas reduces the fluid pressure surging.

In another aspect, a nozzle of a plasma arc torch is provided. The nozzle comprises a shell including a body having a plasma exit orifice disposed therein, an internal shell surface, and an external shell surface. The nozzle also comprises a liner having an internal liner surface and an external liner surface. At least a portion of the external liner surface is surrounded by the internal shell surface. The nozzle further comprises an isolation chamber defined by at least a portion of the shell, the liner, and a sealing surface located between the liner and the shell. The isolation chamber is fluidly connected to a plenum gas flow passage coupled to the plasma exit orifice via a nozzle plenum. The isolation chamber is dimensioned to maintain a volume of substantially stagnant gas received from the plenum gas flow passage, thereby reducing surges in the fluid pressure in the nozzle plenum.

In some embodiments, the isolation chamber is substantially non-vented with a common inlet and outlet indirectly connected to the plenum gas flow.

In some embodiments, the shell comprises at least one vent aperture disposed in the shell body fluidly connecting the internal shell surface to the external shell surface. Alternatively, the shell is non-vented.

In some embodiments, a proximal portion of the isolation chamber is at least partially defined by the sealing surface that is configured to seal an opening between the liner and the shell. In some embodiments, the external liner surface includes a plurality of slots extending axially to fluidly connect the isolation chamber to the plasma exit orifice.

In some embodiments, a volume of the isolation chamber is about 0.03 cubic inches. In some embodiments, a ratio of the volume of the isolation chamber to a combined volume of the plenum gas flow passage and the plenum is about 0.4 to about 0.5.

In another aspect, a method is provided for reducing fluid pressure surging in a nozzle plenum that is located between a nozzle and an electrode of a plasma arc torch. The method comprises supplying a plasma gas into a proximal end of the nozzle. The plasma gas is adapted to flow into the nozzle plenum and distally exit the nozzle via a nozzle exit orifice. The method further comprises diverting a portion of the plasma gas to flow into an isolation chamber, where the portion of the plasma gas is substantially stagnant in the isolation chamber; and reducing the fluid pressure surging in the nozzle plenum.

In some embodiments, the method further comprises venting a portion of the plasma gas through a vent hole that is fluidly connected to a vent channel coupled to the nozzle exit orifice. The method can further comprise returning a portion of the plasma gas in the isolation chamber to the nozzle plenum.

In some embodiments, the method further comprises reducing fluid pressure surging adjacent to the vent hole by the flowing of the portion of the plasma gas in the isolation chamber.

In some embodiments, the method further comprises flowing the portion of the plasma gas in the isolation chamber distally toward the nozzle plenum via a plurality of channels dispersed around an external surface of a liner of the nozzle to reduce a pressure surge.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention

FIGS. 6a-d show cut edge results when a nozzle without an isolation chamber is used in a plasma arc torch to make one or more cuts.

FIG. 7 shows a voltage trace of the work-to-electrode voltage (VWE) associated with making the cuts of FIGS. 6a-d.

DETAILED DESCRIPTION

Figure 1:
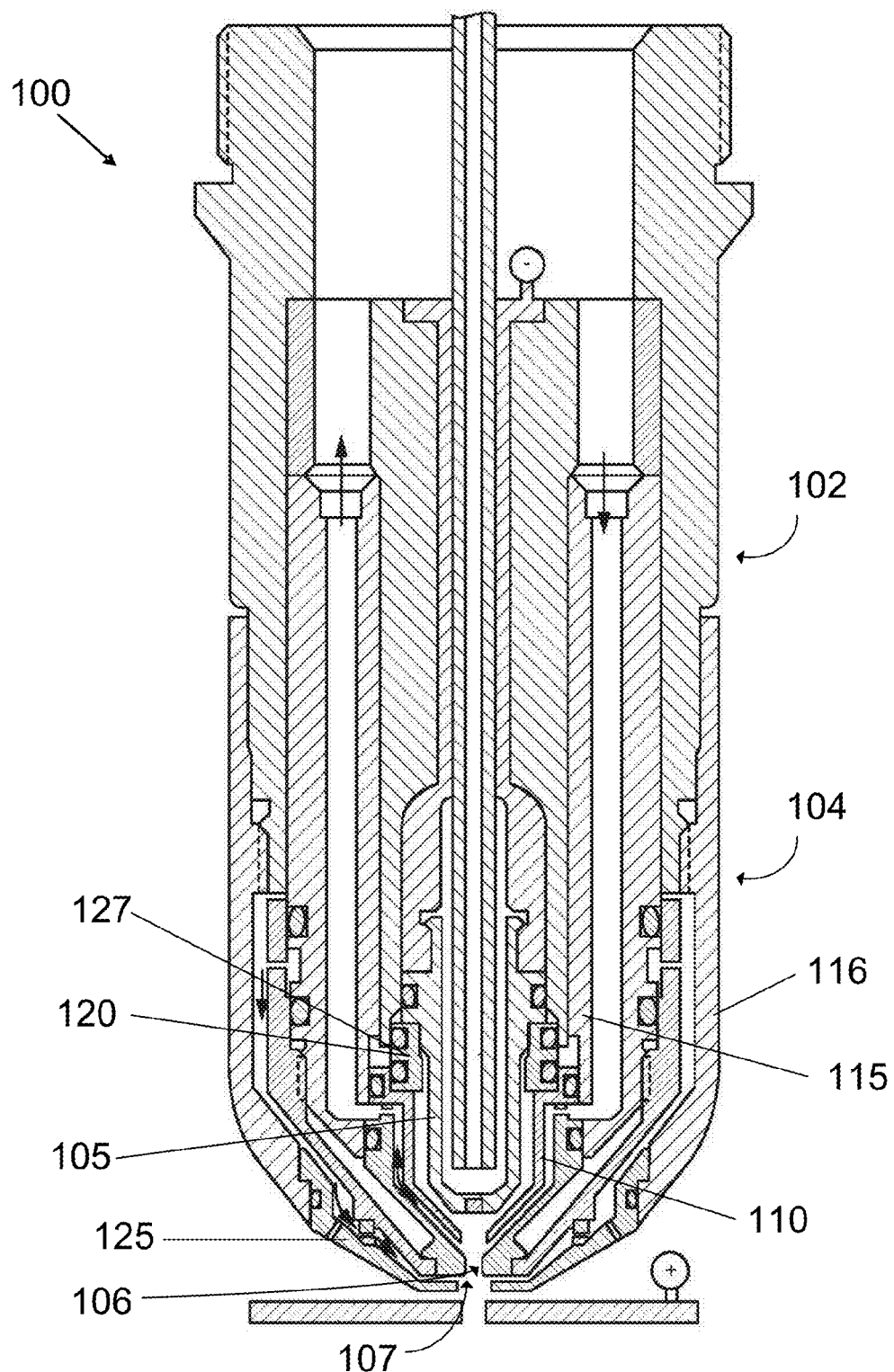
FIG. 1 is a cross-sectional view of an exemplary prior art plasma arc torch.

FIG. 1 shows a cross-sectional view of an exemplary prior art liquid-cooled plasma arc torch 100 including a torch body 102 and a torch tip 104. The torch tip 104 includes multiple consumables, for example, an electrode 105, a nozzle 110, a retaining cap 115, a swirl ring 120, and a shield 125. The torch body 102, which has a generally cylindrical shape, supports the electrode 105 and the nozzle 110. The nozzle 110 is spaced from the electrode 105 and has a central exit orifice 106 mounted within the torch body 102. The swirl ring 120 is mounted to the torch body 102 and has a set of radially offset or canted gas distribution holes 127 that impart a tangential velocity component to the plasma gas flow, causing the plasma gas flow to swirl. The shield 125, which also includes an exit orifice 107, is connected (e.g., threaded) to the retaining cap 115. The retaining cap 115 as shown is an inner retaining cap securely connected (e.g., threaded) to the nozzle 110 to retain the nozzle 110 to the plasma arc torch 100 and radially and/or axially position the nozzle 110 with respect to a longitudinal axis of the torch 100. In some embodiments, an outer retaining cap 116 is secured relative to the shield 125. The torch 100 can additionally include electrical connections, passages for cooling, passages for arc control fluids (e.g., plasma gas), and a power supply. In some embodiments, the consumables also include a welding tip, which is a nozzle for passing an ignited welding gas.

In operation, plasma gas flows through a gas inlet tube (not shown) and the gas distribution holes 127 in the swirl ring 120. From there, the plasma gas flows into a nozzle plenum 128 and out of the torch 100 through the exit orifice 106 of the nozzle 110 and the exit orifice 107 the shield 125. A pilot arc is first generated between the electrode 105 and the nozzle 110. The pilot arc ionizes the gas passing through the nozzle exit orifice 106 and the shield exit orifice 107. The arc then transfers from the nozzle 110 to a workpiece (not shown) for thermally processing (e.g., cutting or welding) the workpiece. It is noted that the illustrated details of the torch 100, including the arrangement of the components, the direction of gas and cooling fluid flows, and the electrical connections, can take a variety of forms.

Figure 2:
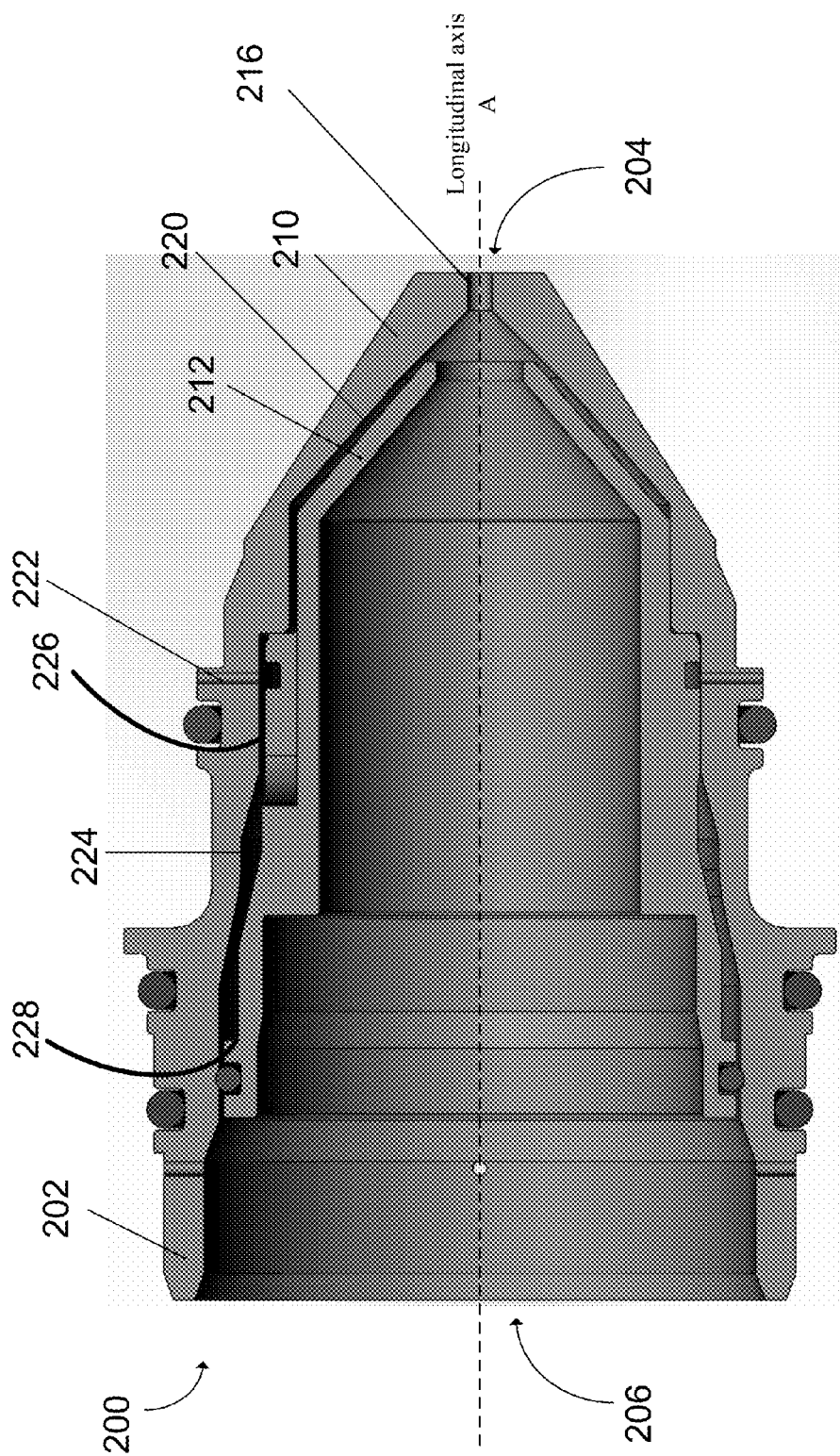
FIG. 2 shows an exemplary vented nozzle configured to reduce fluid pressure surging in a nozzle plenum.

FIG. 2 shows an exemplary vented nozzle 200 configured to reduce fluid pressure surging in a nozzle plenum of a liquid-cooled plasma arc torch. The vented nozzle 200 of FIG. 2 can be used in the liquid-cooled torch 100 of FIG. 1 in place of the nozzle 110 or in similar plasma arc torches. As shown, the vented nozzle 200 includes a nozzle body 202 defining a longitudinal axis A. The nozzle body 202 has a distal end 204, which is the end positioned closest to a workpiece during torch operations, and a proximal end 206 opposite of the distal end 204 along the longitudinal axis A. The nozzle body 202 can include two pieces, an outside piece hereinafter referred to as a nozzle shell 210 and an inside piece hereinafter referred to as a nozzle liner 212. The nozzle shell 210, which includes an internal shell surface and an external shell surface, can surround at least a portion of the nozzle liner 212, which includes an internal liner surface and an external liner surface. For example, the internal shell surface of the shell 210 can substantially surround the external liner surface of the liner 212, as shown in the vented nozzle 200 of FIG. 2. The nozzle body 202 can further include a plasma gas exit orifice 216 located at the distal end 204 of the nozzle body 202.

Figure 3:
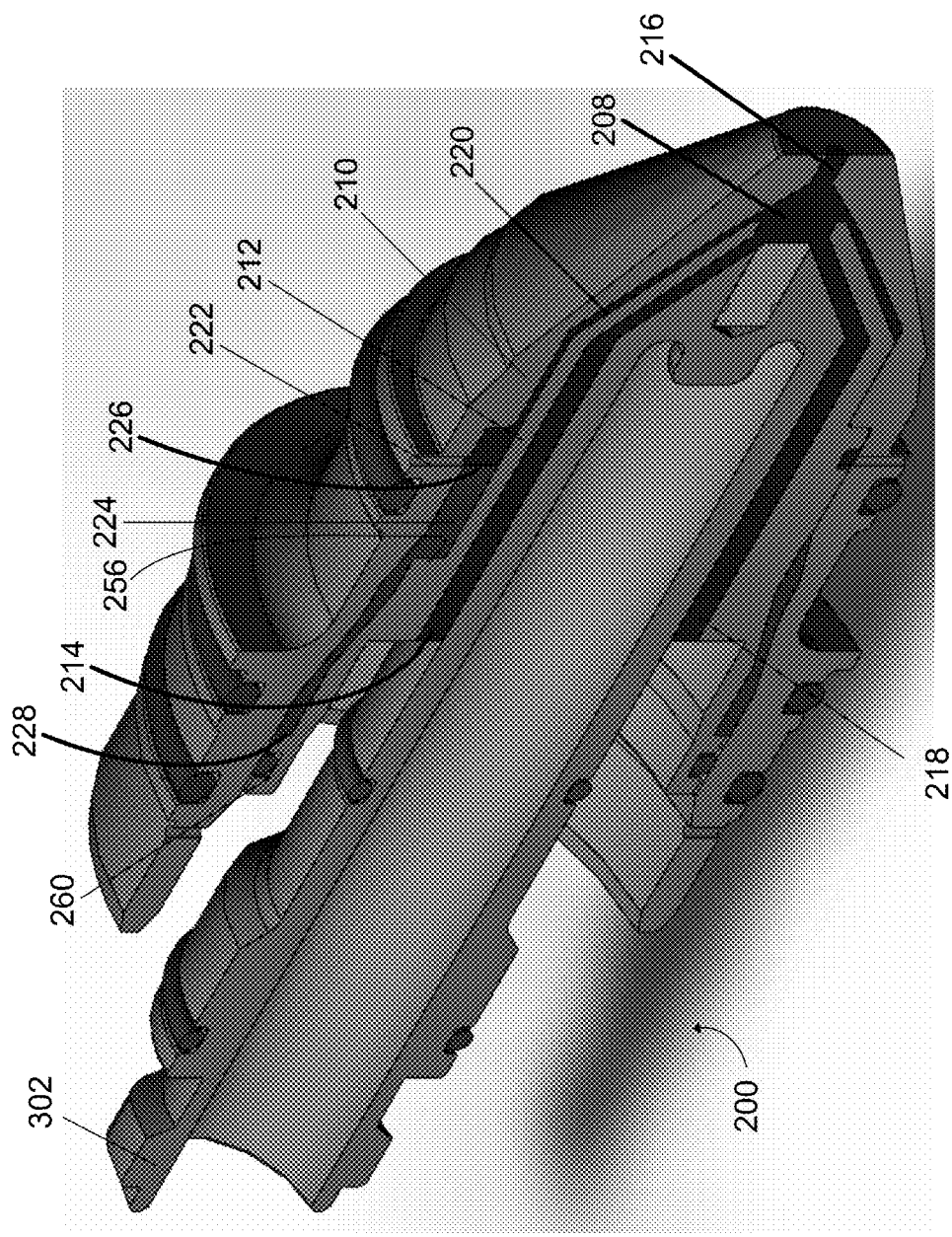
FIG. 3 shows an exemplary electrode disposed inside of the vented nozzle of FIG. 2.

FIG. 3 shows an exemplary electrode 302 disposed inside of the vented nozzle 200 of FIG. 2, where the electrode 302 can be the same as or similar to the electrode 105 of FIG. 1. The spaced region between the distal ends of the electrode 302 and the nozzle body 202 comprises a nozzle plenum 208. A plasma gas passageway 218 is defined between the internal surface of the nozzle liner 212 and the external surface of the electrode 302. A plenum gas inlet 214, located at the proximal end 206 of the nozzle body 202, is configured to introduce a plasma gas to the plasma gas passageway 218 that is fluidly connected to the plasma gas exit orifice 216 via the nozzle plenum 208. Thus, the plenum gas inlet 214, the nozzle plenum 208 and the plasma gas exit orifice 216 can be fluidly and directly connected by the plasma gas passageway 218.

The body 202 of the vented nozzle 200 can also include at least one vent channel 220 between the interior surface of the nozzle shell 210 and the exterior surface of the nozzle liner 212. The vent channel 220 is fluidly connected to the plasma gas passageway 218 and the nozzle exit orifice 216 at the nozzle plenum 208. A portion of the plasma gas introduced into the plasma gas passageway 218 can be vented from the nozzle 200 via the vent channel 220 and can exit from an aperture in the nozzle shell 210, hereinafter referred to as a vent hole 222, to atmosphere and/or another passageway (not shown) within the torch.
The vent hole 222 fluidly connects the internal surface of the nozzle shell 210 to the external surface of the nozzle shell 210.

The nozzle body 202 of the vented nozzle 200 can further include at least one isolation chamber 224 fluidly and indirectly connected to the plasma gas passageway 218. That is, the gas traveling along the gas passageway 218 does not directly pass through the isolation chamber 224. At least one side channel diverts the gas along the gas passageway 218 to flow into the isolation chamber 224. For example, as shown in FIGS. 2 and 3, the vent channel 220 diverts/allows some of the plasma gas from the gas passageway 218 into the isolation chamber 224. The isolation chamber 224 can have a common inlet and outlet, hereinafter referred to as isolation chamber opening 226, fluidly connected to the vent channel 220. As shown in FIGS. 2 and 3, the isolation chamber 224 can provide an additional volume indirectly connected to the fluid flow path by extending one or more slots/passages in the liner 212 proximally beyond the vent hole 222 to define the isolation chamber 224. The isolation chamber 224 can be a substantially enclosed (e.g., non-vented) volume having one opening 226 that functions as both an inlet and an outlet. In some embodiments, opening 226 extends circumferentially about and/or within the vented nozzle 200. As shown, the isolation chamber 224 is defined by (i) at least a portion of the internal surface of the nozzle shell 210, (ii) at least a portion of the external surface of the nozzle liner 212, and (iii) a sealing surface 228 located between the nozzle liner 212 and the nozzle shell 210, where the sealing surface 228 forms a proximal wall of the isolation chamber 224. The sealing surface 228 can be a part of the liner 212 and/or the shell 210. In some embodiments, the isolation chamber 224 can be created by milling axially into the nozzle liner 212 and/or the nozzle shell 210, thereby exposing the plasma gas from the gas inlet 214 to the isolation chamber 224.

As described above, the isolation chamber 224 can be indirectly connected to the plasma gas passageway 218 between the plenum gas inlet 214 and the plasma exit orifice 216 by a side channel, such as the vent channel 220. In some embodiments, multiple isolation chambers 224 can be indirectly connected in such a fashion to the plasma gas passageway 218. In operation, a plasma gas introduced into the torch from the plasma gas inlet 214 is adapted to travel distally along the gas passageway 218 to the nozzle plenum 208. A portion of the plasma gas in the plenum 208 can exit the torch via the plasma gas exit orifice 216. Another portion of the plasma gas in the plenum 208 can be diverted to flow proximally through the vent channel 220. A portion of the diverted plasma gas can be vented to atmosphere through the vent hole 222, while another portion of the diverted plasma gas can flow into the isolation chamber 224 via the chamber opening 226. The isolation chamber 224 is thus downstream from the nozzle plenum 208 and/or the vent hole 222.

Generally, the isolation chamber 224 is configured to receive and maintain a volume of substantially stagnant gas. Because the isolation chamber 224 has a common entrance and exit opening 226 that serves as both an inlet and an outlet, the plasma gas in the isolation chamber 224 can either stay in the chamber 224 or exit the chamber 224 in the same way it entered the chamber 224. The isolation chamber 224 thus acts as a "dead end" on the gas flow path. A pressure of the volume of substantially stagnant gas in the isolation chamber 224 is adapted to modulate the fluid pressure surging in the nozzle plenum 208, thereby dampening any vibration or resonance of the plasma gas in the plenum 208 caused by pressure surge(s). For example, due to constriction by the plasma exit orifice 216, surging back pressure caused by debris/workpiece, and/or and high pressure of the plasma gas flow along the passageway 218, fluid pressure in the plenum 208 can dramatically increase to beyond the fluid pressure in the isolation chamber 224, at which point the isolation chamber 224 allows at least a portion of the gas in the plenum 208 to flow proximally into the isolation chamber 224, thereby relieving the fluid pressure in the plenum 208 to dampen any vibration in the plenum 208. Once the fluid pressure in the plenum 208 falls below the fluid pressure of the isolation chamber 224, at least a portion of the gas in the isolation chamber can flow distally to return to the plenum 208. Hence, the isolation chamber 224 can be positioned and sized to regulate the fluid pressure in the plenum 208 such that the rate of fluid pressure increase or decrease in the plenum 208 is dampened. The compressible volume in the isolation chamber 224 can drive the observed gas pressure through nozzle exit orifice 216 (e.g., that observed by the workpiece) to be more consistent throughout the cut, supplying extra gas pressure when the fluid pressure in plenum 208 falls and absorbing excess back pressure into plenum 208 when feedback pressure is received. Based on the same principle, the isolation chamber 224 can also relieve the fluid pressure adjacent to the vent hole 222 as the isolation chamber 224 is fluidly connected between the plenum 208 and the vent hole 222. Further, as the gas is compressible, by significantly increasing the gas volumes in the nozzle 200, including the plenum region 208, a dampening effect can be enhanced to normalize and reduce vibrations.

The abrupt feedback and irregular gas flows can be smoothened by spreading compression across these volumes and creating more regular gas flow.

In some embodiments, a volume of the isolation chamber 224 is about 0.03 cubic inches. In some embodiments, a ratio of the volume of the isolation chamber 224 to a combined volume of the plenum gas flow passage 218, the nozzle plenum 208, and the plasma gas exit orifice 216 is about 0.4 to about 0.5, such as about 0.48. In some embodiments, the size of the chamber opening 226 and/or the size of the side channel leading to the isolation chamber 224 (e.g., the vent channel 220) can also be adjusted to provide a desired rate at which the gas in the plenum 208 can be diverted into the isolation chamber 224 or at which the gas in the isolation chamber 224 can be released into the plenum 208. For example, a constriction mechanism can be coupled to the isolation chamber opening 226 and/or the side channel to constrict or expand the fluid flow therethrough. In some embodiments, the vent channel 220 and/or the chamber opening 226 are sized to throttle and/or choke the isolation chamber 224. For example, the vent channel 220 or the chamber opening 226 can be sized significantly smaller than the overall volume of the isolation chamber 224 so as to modulate/regulate gas flow into and out of the isolation chamber 224. In some embodiments, the size or ratio of the isolation chamber 224, vent channel 220, and/or chamber opening 226 are tailored or set specific to an intended use or operation of the nozzle 200. Generally, by increasing the gas volumes present in the vented nozzle 200 during operation arc stability and cut quality are greatly improved.

Figure 4:
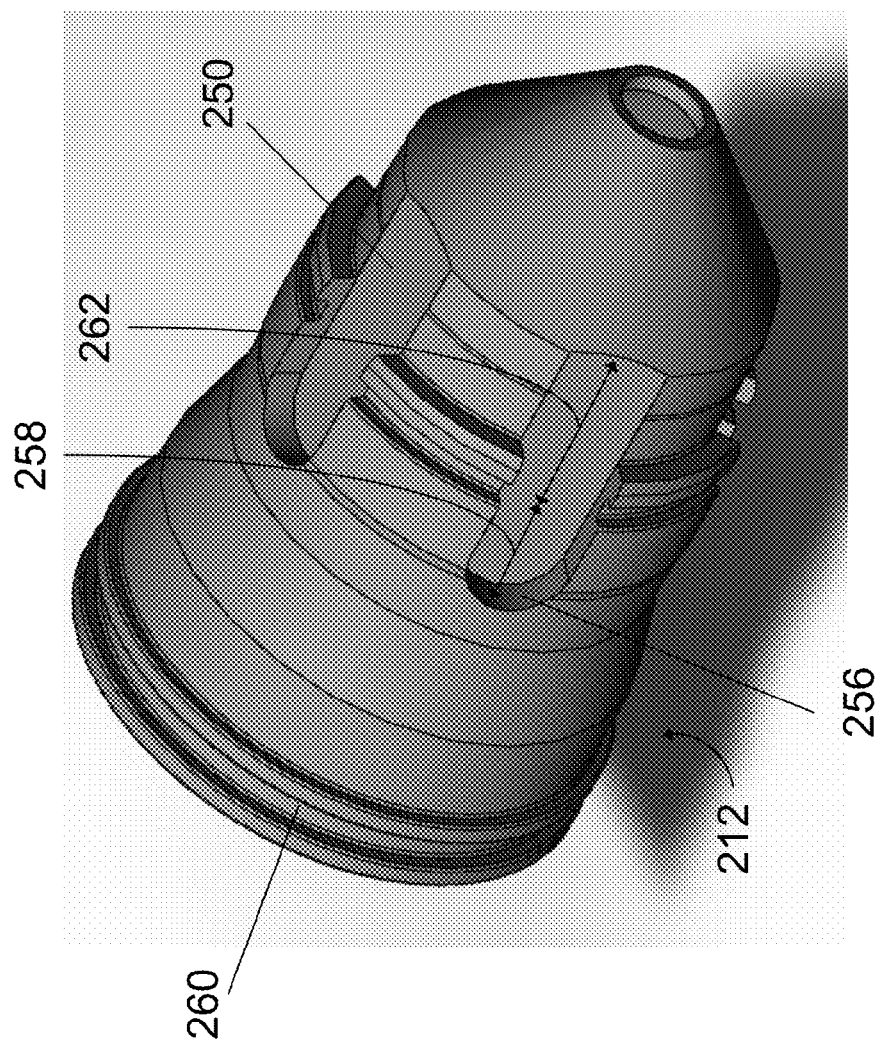
FIG. 4 shows an exterior view of the nozzle liner of the vented nozzle of FIGS. 2 and 3.

FIG. 4 shows an exterior view of the nozzle liner 212 of the vented nozzle 200 of FIGS. 2 and 3. As shown, the external surface of the nozzle liner 212 includes multiple slots 250 spaced circumferentially around the liner 212, where each slot 250 extends longitudinally toward the distal end 204 of the nozzle 200. The proximal end wall 256 of each slot 250 corresponds to the beginning of the tapered section of the isolation chamber 224, as illustrated in FIG. 3. Thus, a proximal portion 258 of each slot 250 partially defines a portion of the common entrance and exit opening 226 of the isolation chamber 224. In preferred embodiments, the common entrance and exit opening 226 can have five portions each corresponding to a different slot 250. The isolation chamber 224 can extend proximally beyond the end wall 256 of each slot 250, such as close to the groove 260 of the liner 212. In some embodiments, the longitudinal length of the proximal portion 258 of each slot 250 is the length between the end wall 256 and where the vent hole 222 is situated. The distal portion 262 of each slot 250 partially defines a section of the vent channel 220 connected to the nozzle plenum 208/plasma gas passageway 218. In general, each slot 250 serves as a port for conducting a volume of substantially stagnant gas between the isolation chamber 224 and the plenum 208/plasma gas passageway 218 to automatically regulate the fluid pressure in the plenum 208.

Figure 5:
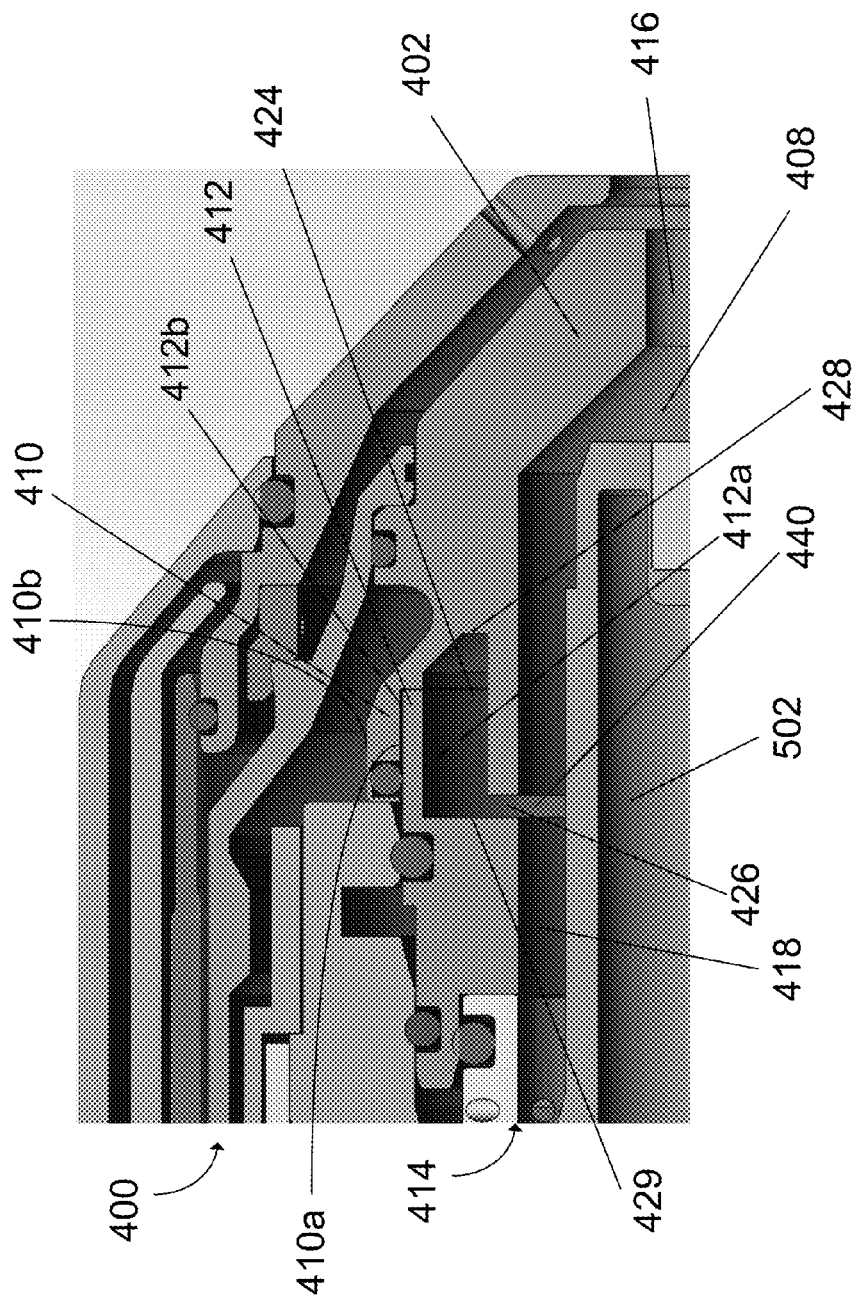
FIG. 5 shows a portion of an exemplary non-vented nozzle configured to reduce fluid pressure surging in a nozzle plenum.

FIG. 5 shows a portion of an exemplary non-vented nozzle 400 configured to reduce fluid pressure surging in a nozzle plenum. The non-vented nozzle 400 of FIG. 4 is usable in the liquid-cooled torch 100 of FIG. 1 or a similar torch. As shown, the non-vented nozzle 400 includes a nozzle body 402 comprising two pieces, an outside piece hereinafter referred to as a nozzle shell 410 and an inside piece hereinafter referred to as a nozzle liner 412. The nozzle shell 410, which includes an internal shell surface 410a and an external shell surface 410b, can overlap with at least a portion of the nozzle liner 412, which includes an internal liner surface 412a and an external liner surface 412b.

The non-vented nozzle 400 can be similar in construction and function as the vented nozzle 200 of FIGS. 2 and 3 except the non-vented nozzle 400 does not include a vent channel or a vent hole. For example, similar to the vented nozzle 200, the non-vented nozzle 400 can include a nozzle plenum 408 between the distal ends of the electrode 502 and the nozzle body 402. A plasma gas passageway 418 is defined between the internal surface of the nozzle body 402 and the external surface of the electrode 502. A plenum gas inlet 414 is configured to introduce a plasma gas to the plasma gas passageway 418 that is fluidly connected to the plasma gas exit orifice 416 via the nozzle plenum 408. Similar to the vented nozzle 200, the plenum gas inlet 414, the nozzle plenum 408 and the plasma gas exit orifice 416 can be fluidly and directly connected by the plasma gas passageway 418.

The body 402 of the non-vented nozzle 400 can further include at least one isolation chamber 424 fluidly and indirectly connected to the plasma gas passageway 418 via a side channel. That is, the gas traveling along the gas passageway 418 does not directly pass through the isolation chamber 424. At least one side channel, such as the side channel 440, diverts/allows the gas along the gas passageway 418 to flow into the isolation chamber 424.

Similar to the isolation chamber 224, the isolation chamber 424 can have a common inlet and outlet, hereinafter referred to as isolation chamber opening 426. The isolation chamber 424 can be a substantially enclosed (e.g., non-vented) volume having, e.g., one annular opening 426.

As shown in the embodiment of FIG. 5, the isolation chamber 424 is defined by (i) at least a portion of the internal surface of the nozzle shell 410, (ii) at least a portion of the internal surface of the nozzle liner 412, and (iii) one or more sealing surfaces 428, 429 that can be a part of the shell 410 and/or the liner 412. In some embodiments, the isolation chamber 424 can be created by milling axially into the nozzle liner 412 and/or the nozzle shell 410, thereby exposing the plasma gas from the gas inlet 414 to the chamber 424. Alternatively, the non-vented nozzle 400 can be a one-piece nozzle (i.e., without being divided into the shell 410 and the liner 412), having the isolation chamber 424 milled into the unitary body of the nozzle 400.

The isolation chamber 424 of the non-vented nozzle 400 can provide similar functions as that of the vented nozzle 200. The isolation chamber 424 can be configured to receive and maintain a volume of substantially stagnant gas via the opening 426. A pressure of the volume of substantially stagnant gas in the isolation chamber 424 is adapted to modulate the fluid pressure surging in the nozzle plenum 408, thereby dampening vibration and resonance of the plasma gas in the plenum 408 caused by the pressure surge. In some embodiments, a volume of the isolation chamber 424 is about 0.03 cubic inches. In some embodiments, a ratio of the volume of the isolation chamber 424 to a combined volume of the plenum gas flow passage 418, the plenum 408, and the plasma exit orifice 416 is about 0.4 to about 0.5, such as about 0.48. In addition, the size of the chamber opening 426 and/or the size of the side channel 440 can be adjusted to provide a desired rate at which the gas in the plenum 408 and the gas in the isolation chamber 424 can flow back and forth. In some embodiments, multiple isolation chambers 424 can be built into the non-vented nozzle 400 to regulate fluid pressure in the nozzle 400.

FIGS. 6a-d show cut edge results when a nozzle without an isolation chamber is used in a plasma arc torch to make multiple cuts. As shown, unpredictable and generally poor edge quality is produced along the edge of each cut, which is caused by high and uneven fluid pressure (e.g., reverberations) in the nozzle plenum.

FIG. 7 shows a voltage trace of the work-to-electrode voltage (VWE) 600 associated with making the cuts of FIGS. 6a-d with a plasma arc torch that comprises a nozzle without an isolation chamber. The large spikes 602 of the VWE line are normal and occur when the plasma torch changes directions, which in this example includes 90-degree turns at the corner of a workpiece. Ideally, under steady-state conditions, the VWE line segments 604 that are between the spikes 602 are flat (i.e., have a constant work-to-electrode voltage), where each line segment 604 corresponds to a respective cut of FIGS. 6a-d. However, the VWE line segments 604 illustrated in FIG. 7 are not flat, which indicate arc instability during each cut operation that results in poor edge quality on each side of the cuts of FIGS. 6a-d and risk occurrence of double-arcing events.

Figure 8:
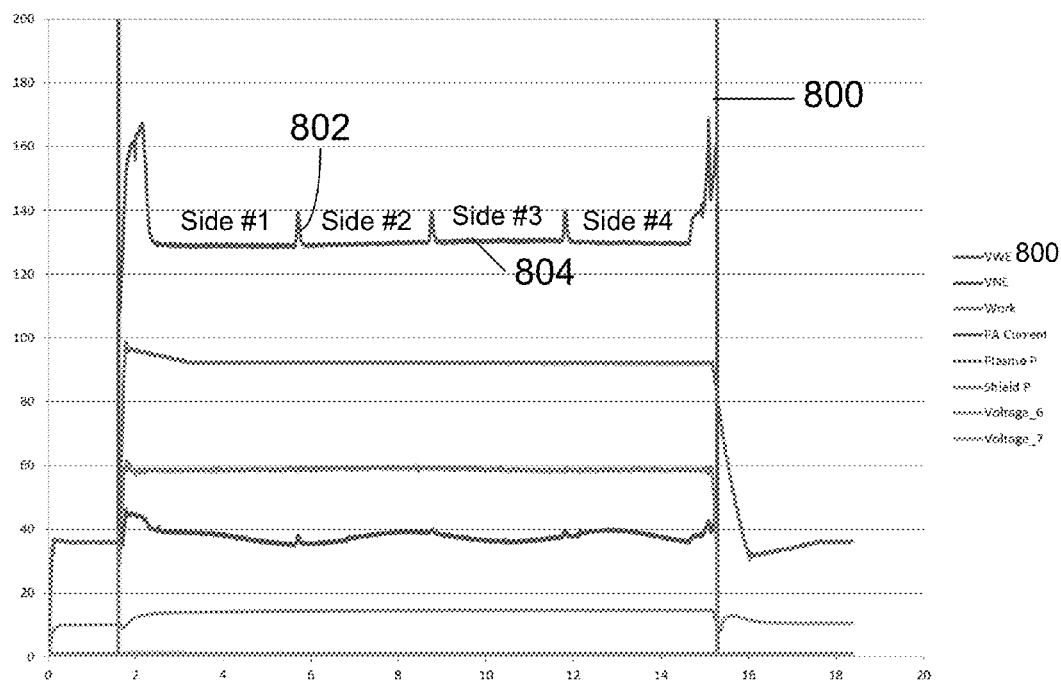
FIG. 8 shows a voltage trace of the work-to-electrode voltage (VWE) associated with making cuts with a plasma arc torch that comprises a nozzle with an isolation chamber.
Figure 9:
FIG. 9 shows cut edge results when a nozzle with an isolation chamber is used in a plasma arc torch to make a cut.

FIG. 8 shows a voltage trace of the work-to-electrode voltage (VWE) 800 associated with making cuts with a plasma arc torch that comprises a nozzle with an isolation chamber, such as the vented nozzle 200 or the non-vented nozzle 400. The cuts are made under similar conditions as the cuts of FIGS. 6a-d. As shown, the VWE line segments 804 between spikes 802, where each line segment 804 corresponds to a particular cut, are relatively flat, thus indicating steady, smooth flow of plasma gas through the nozzle plenum due to the dampening effect of the isolation chamber, reduction of double-arcing events, and improvement of arc stability, FIG. 9 shows cut edge results when a nozzle with an isolation chamber (e.g., the nozzle 200 of FIG. 2) is used in a plasma arc torch to make a cut in a workpiece. As shown, the cut edge is much smoother, demonstrating improved surface quality. This indicates improved arc stability due to relatively stable fluid pressure in the nozzle plenum, thereby lowering the risk of double arcing, which also prolongs the usable life of the nozzle.

Figure 10:
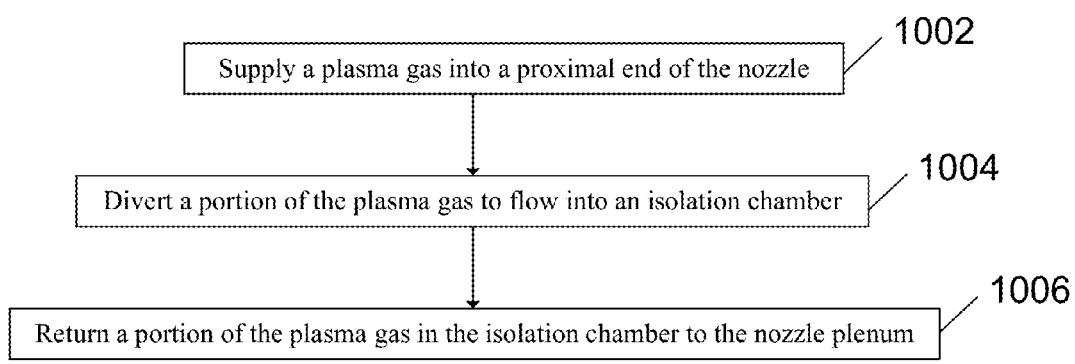
FIG. 10 shows an exemplary process for operating a nozzle of the present invention to reduce fluid pressure surging in a nozzle plenum of a plasma arc torch.

FIG. 10 shows an exemplary process for operating a nozzle of the present invention to reduce fluid pressure surging in a nozzle plenum of a plasma arc torch. The nozzle can be a vented nozzle (e.g., the nozzle 200) or a non-vented nozzle (e.g., the nozzle 400). For the purpose of illustration, the process is explained with respect to the vented nozzle 200 of FIG. 2. A plasma gas is supplied to the proximal end 206 of the nozzle 200 via the plasma gas inlet 228 (step 1002). The plasma gas is adapted to flow distally through the nozzle in the plasma gas passageway 218 to reach the nozzle plenum 208. If there is a build-up of fluid pressure in the plenum 208, a side channel connected to the plasma gas passageway 218 or the nozzle plenum 208 can divert/receive at least a portion of the plasma gas into the isolation chamber 224 (step 1004) to reduce the pressure surges in the plenum 208. For example, the vent channel 220 fluidly connected to the nozzle plenum 208 can divert a portion of the plasma gas to flow proximally to the isolation chamber 224 via the chamber opening 226. This diversion can occur when the fluid pressure in the plenum 208 is greater than that in the isolation chamber 224. Conversely, if the fluid pressure in the isolation chamber 224 is lower than that of the nozzle plenum 208, at least a portion of the stagnant gas in the isolation chamber 224 can be returned to the plenum 208 (step 1006). Such a back-and-forth flow of the stagnant volume of plasma gas between the plenum 208 and the isolation chamber 224 can automatically regulate the fluid pressure in the nozzle plenum 208, thereby dampening any reverberation or resonance of fluid in the torch. The flow of the stagnant volume of plasma gas between the plenum 208 and the isolation chamber 224 can be via a plurality of slots 250 etched on the external surface of the nozzle liner 212. In the vented nozzle 200, the plasma gas from the gas passageway 218 can be vented to atmosphere and/or other torch passageway(s) via the vent hole 222 that is fluidly connected to the plenum 208 and the plasma gas exit orifice 216 via the vent channel 220. The isolation chamber 224 is fluidly connected to the vent channel 220 between the vent hole 222 and the plenum 208/plasma gas exit orifice 216. The isolation chamber 224 can thus reduce fluid pressure surging not only in the plenum 208, but also adjacent to the vent hole 222. In the non-vented nozzle 400, a vent channel and vent hole are absent. That is, the plasma gas is not vented to atmosphere. Otherwise, the function of the isolation chambers in both nozzle designs can be substantially the same.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed:

1. A nozzle of a plasma arc torch, the nozzle configured to reduce fluid pressure surging in a nozzle plenum, the nozzle comprising:
   a nozzle body having a proximal end and a distal end, the nozzle plenum defined between the nozzle body and an electrode of the plasma arc torch;
   a nozzle plenum gas inlet located at the proximal end of the nozzle body;
   a plasma gas exit orifice located at the distal end of the nozzle body;
   a plasma gas passageway fluidly connecting the nozzle plenum gas inlet to the plasma gas exit orifice; and
   an isolation chamber having a common inlet and outlet fluidly connected to the plasma gas passageway and the nozzle plenum, the isolation chamber sized to receive a volume of substantially stagnant gas to reduce the fluid pressure surging in the nozzle plenum.

2. The nozzle of claim 1, further comprising a vent channel fluidly connected to the plasma gas passageway at the plasma gas exit orifice, wherein the common inlet and outlet of the isolation chamber is fluidly connected to the vent channel.

3. The nozzle of claim 2, further comprising a vent hole connected to the vent channel, wherein the isolation chamber is axially located between the nozzle plenum gas inlet and the vent hole.

4. The nozzle of claim 1, wherein the isolation chamber includes a constriction mechanism at the common inlet and outlet.

5. The nozzle of claim 1, wherein the nozzle body further comprises a liner, a shell and a sealing surface between the liner and the shell that cooperatively define the isolation chamber.

6. The nozzle of claim 1, wherein a pressure of the volume of substantially stagnant gas reduces the fluid pressure surging.

7. A nozzle of a plasma arc torch, the nozzle comprising:
   a shell including a body having a plasma exit orifice disposed therein, an internal shell surface, and an external shell surface;

a liner having an internal liner surface and an external liner surface, at least a portion of the external liner surface surrounded by the internal shell surface; and an isolation chamber defined by at least a portion of the shell, the liner, and a sealing surface located between the liner and the shell, the isolation chamber having a common inlet and outlet being fluidly connected to a plenum gas flow passage coupled to the plasma exit orifice via a nozzle plenum, the isolation chamber being dimensioned to maintain a volume of substantially stagnant gas received from the plenum gas flow passage, thereby reducing surges in the fluid pressure in the nozzle plenum.

8. The nozzle of claim 7, wherein the isolation chamber is substantially non-vented with the common inlet and outlet indirectly connected to the plenum gas flow.

9. The nozzle of claim 7, wherein the shell comprises at least one vent aperture disposed in the shell body fluidly connecting the internal shell surface to the external shell surface.

10. The nozzle of claim 7, wherein the shell is non-vented.

11. The nozzle of claim 7, wherein a proximal portion of the isolation chamber is at least partially defined by the sealing surface that is configured to seal an opening between the liner and the shell.

12. The nozzle of claim 7, wherein the external liner surface includes a plurality of slots extending axially to fluidly connect the isolation chamber to the plasma exit orifice.

13. The nozzle of claim 7, wherein a volume of the isolation chamber is about 0.03 cubic inches.

14. The nozzle of claim 13, wherein a ratio of the volume of the isolation chamber to a combined volume of the plenum gas flow passage and the plenum is about 0.4 to about 0.5.

15. A method of reducing fluid pressure surging in a nozzle plenum that is located between a nozzle and an electrode of a plasma arc torch, the method comprising:

supplying a plasma gas into a proximal end of the nozzle, the plasma gas is adapted to flow into the nozzle plenum and distally exit the nozzle via a nozzle exit orifice;

diverting a portion of the plasma gas to flow into an isolation chamber via a common inlet and outlet of the isolation chamber, wherein the portion of the plasma gas is substantially stagnant in the isolation chamber; and reducing the fluid pressure surging in the nozzle plenum based on the diverting.

16. The method of claim 15, further comprising venting a portion of the plasma gas through a vent hole that is fluidly connected to a vent channel coupled to the nozzle exit orifice.

17. The method of claim 16, further comprising reducing fluid pressure surging adjacent to the vent hole by the flowing of the portion of the plasma gas into the isolation chamber.

18. The method of claim 15, further comprising returning a portion of the plasma gas in the isolation chamber to the nozzle plenum via the common inlet and outlet of the isolation chamber.

19. The method of claim 15, further comprising flowing the portion of the plasma gas in the isolation chamber distally toward the nozzle plenum via a plurality of channels dispersed around an external surface of a liner of the nozzle to reduce a pressure surge.

* * * * *